United States Patent Office 3,556,729
Patented Jan. 19, 1971

3,556,729
PROCESS FOR OXIDIZING AND CARBONIZING ACRYLIC FIBERS
John R. Holsten and Jerimah G. Morrison, Jr., Raleigh, N.C., assignors to Monsanto Company, St. Louis, Mo., a corporation of Delaware
No Drawing. Filed Mar. 24, 1969, Ser. No. 809,998
Int. Cl. C01b 31/07
U.S. Cl. 23—209.1                   10 Claims

ABSTRACT OF THE DISCLOSURE

This invention provides a process for preoxidizing acrylic fibers which can be converted into carbon or graphite fibers of high strength and modulus. The process involves first heating the fiber, while under tension, to a temperature below 250° C. in an atmosphere of oxygen and bromine for a time sufficient to form a permeable sheath around the fiber. The fiber is next heated in an oxygen atmosphere at a temperature above 250° C. for a time sufficient to allow complete permeation of oxygen throughout the core of the fiber. The oxidized fibers are useful for the construction of fireproof fabrics and may also be carbonized or graphitized by heating in an inert atmosphere at the appropriate temperatures.

BACKGROUND OF THE INVENTION

The present invention relates to an improved method for the preoxidation and graphitization of acrylic fibers. The improvements attained by this process, relative to those described in the prior art, are a reduction in the time required to carry out the preoxidation step and greater control of the degree of crystallinity and surface structure of the resulting graphite yarn.

In recent years, the need for materials having improved mechanical properties, such as tensile strength, stiffness, toughness and high temperature strength has stimulated considerable interest in the use of fiber reinforced resins. Several books and numerous publications have been written describing these composite materials. Although many types of filamentary reinforcement materials have been evaluated in composites, glass reinforced polyester and epoxy resins have been of primary interest for commercial use.

With the advent of the space age, a special need for light-weight thermally stable composite materials having high tensile strength and Young's modulus has risen. The glass reinforced composites are not satisfactory for use in such structures because of their relatively low modulus. Boron reinforced composites, although meeting the requirements of high tensile strength, stiffness and light weight, have limited commercial application, due to the high cost of these filaments.

In the last few years, carbon/graphite fibers have been produced which have very high strength and the highest modulus of elasticity (stiffness) of any known fibers. Moreover, the probability of reducing the cost of these fibers to a level well below that of boron and close to that of the more expensive types of glass is very great. Thus, carbon/graphite filament reinforced composites fulfill the need for light-weight, thermally stable, structural materials having high mechanical property to density ratios very nicely. An appraisal of the use of these composite materials for current and projected military applications as well as for many other civilian applications is very optimistic indeed.

High modulus carbon/graphite filaments are usually produced by the decomposition of organic filamentary precursors at high temperatures in a controlled atmosphere. A major requirement for the successful graphitization of any precursor polymeric fiber is that its softening temperature should be greater than its decomposition temperature so that it will retain its structural integrity throughuot the process. It is also desirable for the material to give high a carbon yield. Although several kinds of "thermally stable" polymers such as polyvinyl alcohol, polybenzimidazoles, polyimides and aromatic polyamides have been used for producing carbon fibers, rayon and acrylonitrile fibers are by far the most widely used precursors.

In general, the conversion of any precursor yarn to a non-fused carbon or graphite yarn involves at least two and usually three distinct process steps as evidenced, e.g., by U. S. Pat. 3,412,062. The first, and by far the most time consuming of these is the "preoxidation" or filament stabilization step. The purpose of this step is to oxidize or cross-link the substrate polymer throughout the entire yarn, so that the resultant yarn can be further processed at higher temperatures without polymer "burn-out" taking place in the filament core. Preoxidation is usually carried out by heating the substrate yarn in a gasous oxidizing atmosphere at temperatures of less than 500° C. After substantially complete preoxidation, the yarn is then carbonized by a further heat treatment in the range of 800–1400° C., in a non-oxidizing atmosphere. If a graphite yarn is desired, the carbon fiber thus obtained is then heated to 1800–3000° C. in a non-oxidizing atmosphere in order to effect graphitization. At these temperatures bond rearrangements occur and graphite crystallites form and grow.

In order to obtain a high strength, high modulus graphite yarn, the basal planes of the graphite crystallites must be oriented largely parallel to the longitudinal axis of the fiber. In the case of acrylic yarns, or those yarns in which the polymeric carbon backbone can theoretically remain largely intact during the over-all conversion to graphite, some degree of the orientation shown in the final graphite yarn may be developed at any stage of the process, including the spinning and drawing of the precursor yarn. The application of stress, such as by stretching, at one or more stages while the yarn is being heated to graphitization temperatures results in the development of the orientation and crystallinity necessary for high strength and modulus. When a batch process is used, stress may be developed in the fiber by internal shrinkage, if the fiber is maintained at constant length during heating.

Although the exact mechanism is not known, it is believed that one of the main series of reactions which occurs during the preoxidation of polyacrylonitrile is as follows. On heating in a oxygen atmosphere, extensive dehydrogenation of the polymer backbone occurs. Some of the pendent nitrile functions are hydroyzed to the imino and/or carboxylic acid structure which catalyze a thermally induced block-type polymerization of properly oriented nitrile functions. The product thus formed should consist of connected segments of a highly thermally stable polynapthyridine structure as shown below.

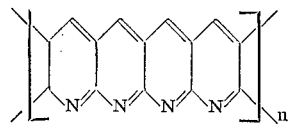

On further heating, the polynaphthyridine which is in a preferred structural form undergoes further reaction to form a graphitic structure.

Other reactions, including crosslinking induced by oxidizing agents, are also possible when PAN fibers are heated in air. Many other crosslinking reactions are also possible either with or without oxygen being involved. These crosslinking reactions may proceed independently but collectively result in the formation of a preferred graphitic precursor structure. On further heating, these preferred precursor structures give rise to graphitic nuclei with basal planes parallel to the direction of the polymer chains.

In addition to the formation of the above preferred structures, many undesirable reactions may also occur on heating PAN fibers. When too rapidly heated to a temperature above about 230° C. these polymers undergo a thermally initiated, autocatalytic highly exothermic reaction which results in interfilamentary fusion. It also causes extensive chain scission and decomposition, resulting in the formation of a "hard" char, which is not a satisfactory form of graphite precursor carbon. The formation of undesirable "hard" char can be prevented by the efficient dissipation of excess heat.

The necessity for heating PAN fibers for long periods of time at relatively low temperatures, as required by the prior art processes for preparing satisfactory graphite precursors by air preoxidation, thus becomes apparent. If the temperature is raised above a certain value too rapidly, uncontrolled exothermic reaction takes place, resulting in fusion and undersirable polymer decomposition. At lower temperatures, the desired stabilization reaction, with air, which is diffusion controlled, take place rapidly at the filament surface and at progressively slower rates with increasing distance from the surface. Should the exothermic reaction be initiated before adequate conversion and stabilization of the filament surface takes place, filament fusion will occur. If the yarn is heated to a high temperature, prior to complete preoxidation of the substrate polymer in the core, decomposition of the undertreated polymer will occur and result in the formation of holes or macrovoids in the core as well as "hard" char carbon, both of which are detrimental to good fiber properties.

Although the demand for high modulus, high strength graphite fibers has grown rapidly, the known methods for producing the same have remained times-consuming and costly. The long time required to carry out the preoxidation step, and the necessity for using a batch process rather than a continuous process for carrying out this reaction is partially responsible for the high cost of these fibers.

Accordingly, it is an object of the present invention to provide a simple, efficient and economical method for the manufacture of high strength, high modulus graphite fibers derived acrylonitrile polymers or copolymers.

Another object of the invention is to provide a method for drastically reducing the time required for the preoxidation of fibers derived from acrylonitrile polymers or copolymers.

Yet another objective of the invention is the provision of a method for the production of a preoxidized acrylic yarn of the preferred structure for subsequent conversion to graphite.

Still another objective is the provision of a continuous process for the rapid preoxidation of acrylic fibers.

A further objective is the provision of a preoxidized acrylic yarn that can be graphitized directly to either a turbostratic or 3-dimensional structural graphite, as desired.

An additional objective is the provision of a preoxidation and graphitization process which makes possible greater control of the crystallinity and surface structure of the graphite yarn.

Other objectives will become apparent from a consideration of the patent specification.

SUMMARY OF THE INVENTION

In accordance with the invention there is provided a process which comprises heating an acrylic polymer fiber, while under tension, in the presence of oxygen and bromine at a temperature below 250° C., preferably below 230° C., for a time sufficient to allow formation of a stable oxygen-permeable sheath on said fiber and insufficient to allow complete permeation of oxygen into the core of the fiber, and thereafter heating the fiber, while under tension, in the presence of oxygen at a temperature above 250° C. for a time sufficient to allow substantially complete permeation of oxygen throughout the fiber.

In addition to the greatly reduced time required for preoxidation, which is the major advantage afforded by the present invention, a product is obtained which may be converted under normal graphitization conditions to a three-dimensionally oriented crystalline graphite, whereas the product obtained by conventional preoxidation procedures is not converted under normal graphitization conditions to this crystalline structure. Furthermore, the preoxidation process described herein may be carried out in either a batchwise or continuous manner.

The terms "acrylc polymer," "polyacrylonitrile" and "PAN" as used herein are intended to include polyacrylonitrile as well as copolymers and terpolymers thereof with other monomers, e.g., vinyl acetate, methyl acrylate, and other like monomers known by those skilled in the art to be polymerizable with acrylonitrile to give satisfactory fibers. The processes used in the production of such polymers, and their conversion into fibers are well known by those skilled in the art.

As stated previously, our invention consists of an improved method for achieving a preoxidized polyacrylonitrile yarn capable to being converted directly to high modules graphite yarn of either the turbostratic or 3-D oriented crystalline structure. The process involves treatment of the polyacrylonitrile fiber with bromine and air at elevated temperatures under specified conditions. In carrying out this invention, the process conditions used for specific fiber systems may vary but should be such that the desired degree of sheath formation is obtained. By the term "desired degree of sheath formation" as used herein is meant a sheath which is permeable to oxygen, non-fusing and sufficiently strong to support the fiber during further processing at higher temperatures. The preoxidation process is essentialily a two-step process, the first step consisting of formation of a permeable surface sheath around the fiber by a bromine-air treatment and the second step consisting of oxidation and controlled cross-linking of the polymer throughout the fiber core by air and heat. The primary advantage of this process, over prior art processes, lies in the fact that a non-fusing permeable skin or sheath is formed rapidly around each filament, making possible use of higher temperatures in carrying the preoxidation reaction to completion. Ideally, the sheath should be as thin and permeable as possible. However, the surface of the fibers must be adequately stabilized to prevent interfilamentary fusion when two or more filaments come into contact at higher temperatures. The process can be carried out in either a batch or a continuous manner .

The batch brominative-air preoxidation process involves heating a constant length of yarn, wound under tension onto a glass bobbin, in a bromine-air atmosphere at, e.g., about 220° C. for 15–30 minutes, followed by heating in air at, e.g., 300–320° C. for one-two hours. The resulting yarn is black, non-fused, strong, non-flammable in a Meker Burner flame and can be graphitized directly to afford high modulus, high strength graphite yarns.

In the actual practice of this invention, as described in greater detail hereinafter, the conditions of time, temperature, rate of heaing and flow rates of the gaseous oxidant reactants can be varied, and the combination of conditions necessary to give optimum results for a specific fiber sample derived from a given polymer system may be readily determined by experiment.

In the first or sheath formation stage of the preoxidation step, air is passed through a chamber over a bromine reservoir at room temperature, sweeping the vapors into and through the heated reaction chamber containing the yarn or fiber. The rate of flow of bromine-air mixture is generally not critical, provided that it, in conjunction with other process parameters, results in the desired degree of permeable sheath formation. The minimum rate of air flow is believed to be determined by or related to the size of the reaction chamber. In the reactor used for the batch process described hereinafter, a minimum rate of about 1 standard cubic foot per hour (s.c.f.h.) was usually required; at lower flow rates, poor properties were obtained. Air flow rates of up to about 10 s.c.f.h. have been used without detrimental effects on the yarn being noted. An upper limit on the flow rate is not believed to be critical, provided that it does not adversely affect the reaction chamber temperature. The concentration of bromine in the mixture also is not critical and need not be precisely controlled, again, provided that surface sheath formation occurs. Although the concentration may vary with the flow rate and temperature, the optimum bromine concentration and flow rate of the gaseous mixture will be dependent upon the combination of other reaction conditions, as well as the chemical composition and structure of the fiber being treated.

The maximum amount of bromine present in the first stage will depend largely on economics and on any corrosive effects on the equipment. This can readily be determined by one skilled in the art. As stated above, the minimum amount of bromine necessary in the first stage is dependent on several factors, including the proper sheath formation. It is difficult, therefore, to express quantitatively just how much bromine is required for adequate sheath formation. There should be sufficient bromine present in this first stage, however, to react with the polyacrylonitrile fiber to the extent that subsequent to the second or "bake-out" stage, at higher temperatures, the preoxidized fiber which emerges contains at least about 1.0% by weight of bromine. Of course, the smaller denier filaments will require higher percentages of bromine since the sheath formation is a surface reaction and in small denier filaments the surface comprises more of the weight of the filament than it does in the heavier denier filament.

For best results in carrying out the process of this invention, both the bromine and gaseous oxidant mixture should be kept reasonably dry, i.e., no additional moisture should be added. The reaction of bromine with PAN is believed to occur primarily by a free radical mechanism. Oxygen is known to catalyze such reactions. The polymer backbone is most likely selectively brominated, replacing the tertiary carbon hydrogen atoms with bromine, followed by thermal dehydrobromination leaving a conjugated polymer backbone. Whereas the anhydrous hydrogen bromide formed in these reactions would be expected to cause little metal corrosion or nitrile hydrolysis problems, it is conceivable that the presence of excess moisture in the gaseous oxidant mixture would contribute to metal corrosion problems as well as excessive hydrolysis of nitrile functions leading to an inferior graphic precursor structure. Thus, the amount of moisture present in the bromination stage should be insufficient to produce any substantial amount of hydrobromic acid which could cause corrosion problems as well as catalyze the excessive hydrolysis of nitrile functions.

It is known that acid gases such as HBr are useful in the preoxidation of hydroxylic fibers such as rayon. Presumably, the hydrobromic acid aids in the dehydration and dehydrogenation of the cellulosic structure. The primary reaction mechanisms involved in these reactions are ionic rather than free radical in nature. The initial reaction most likely involves the acid catalyzed cyclodehydration of the 1,4-diol structures present in each six carbon segment of the cellulose chain. This is followed by the acid catalyzed furan ring cleavage and hydroxyl replacement to give bromide structures which dehydrohalogenate under the influence of heat. Bromine, if used in place of HBr, can react with water formed by thermal dehydration and the above reaction sequence thereby be started, but it is the HBr and not the $Br_2$ which is involved in this reaction sequence. HBr has little or no beneficial effect on the preoxidation of PAN yarns. However, bromine can react with PAN readily by way of a free radical mechanism.

The rate of the preoxidation reaction may be increased by the use of pressure equipment, obviously, if desired, although the reaction proceeds at a satisfactory rate at atmospheric pressure.

The optimum time required for conversion of the fiber surface to the desired degree of sheath formation is generally always less than one hour, usually less than thirty minutes, and will vary depending on the combination of other conditions used, with the time varying inversely with the temperature. While the formation of a suitable sheath can be obtained by numerous combinations of the aforementioned conditions over a broad range, it is obvious that relatively high temperatures in combination with shorter periods of time will be preferred in most instances. However, it is essential that time-temperature treatment conditions must be chosen for a given polymer composition and fiber physical form such that the rate of transformation will not occur so rapidly as to prevent the desired degree of sheath formation.

In addition to time, temperature and polymer composition, other factors affecting the rate of conversion of the fiber surface to the desired degree of sheath formation are the composition and rate of flow of the air-bromine mixture, and the physical parameters of the fiber being treated, such as bulk density, porosity and the ratio of surface area to volume. Since the critical feature of the present invention is concerned with a surface transformation, it is not surprising that the latter parameter is particularly significant with respect to the optimum combination of reaction conditions. In general, less stringent conditions are required to effect a given degree of conversion as the fiber denier decreases or the surface to volume ratio increass.

The development of the necessary conditions for satisfactory sheath formation may be illustrated by the following specific example. Samples of a 1.5 d.p.f. fiber derived from an acrylonitrile copolymer composed of 93 mole percent acrylonitrile and 7 mole percent vinyl acetate were treated under various combinations of time-temperature, flow rate conditions. Adequate sheath formation was accomplished by exposing the yarn to a bromine-air atmosphere at 225° C. for fifteen minutes. A shorter exposure time at the same temperature resulted in a thin sheath being obtained which allowed interfilamentary fusion to occur during the second or "bake-out" stage in air at higher temperatures. Longer exposure times, such as 45–60 minutes, to the bromine-air mixture resulted in the formation of a sheath which was too impermeable to allow sufficient oxygen penetration into the fiber cores during the subsequent "bake-out" stage to completely convert them to a satisfactory preoxidized state. Higher temperatures during the first or bromine-air treatment stage caused filament softening with resulting interfilamentary fusion. Lower temperatures could be used, of course, but required longer exposure times to achieve adequate sheath formation.

In the second, or "bake-out" stage of the preoxidation step, the sheath coated fiber is treated with air at a temperature of about 250° C., usually in the range of 270–320° C. The optimum combination of time, temperature and air flow rate required for the filament core treatment will be dependent on the fiber composition, physical parameters and the permeability of the sheath. In the actual practice of this invention, the exact set of reaction conditions necessary to give optimum results may be readily determined by experiment. In the case of the above actual example, which was given a 15-minute bromine-air treatment at 225° C., it was found that complete conversion of the core was accomplished by heating the yarn in an air stream (2 s.c.f.h. flow rate) at 310° C. for one hour. The resulting preoxidized yarn characteristically contained 6–7% bromine based on fiber weight, was black, free of all interfilamentary and surface fusion, had good strength and flexibility, had no flash-off in a Meker Burner flame, showed no visible skin-core delineation in its microscopic fiber cross-section and could be directly graphitized under stress to afford a high modulus graphite yarn. Higher "bake-out" temperatures sometimes resulted in subsequently derived graphite samples being obtained which had increased brittleness. This is believed to be the result of excessive cross-linking which limited the mobility of the "carbon" structure and thereby limited the development of its maximum tensile properties during graphitization. For best properties, the preoxidized yarn must be able to undergo a certain amount of "stretch" during graphitization; excessive cross-linking restricts the stretch. Adequate core conversion could be attained at 280° C.; however, a longer treatment time was required (about 2.5–4 hrs.).

In carrying out this invention using the batch process, almost any type of apparatus such as a furnace, flask, hot-tube or other suitable heating chamber capable of being heated to about 400° C. and provided with the means for treating the fiber in the manner described herein above may be used. It has been found that a vertical heating chamber is especially suitable for carrying out the batch preoxidation step of this invention.

Air ($O_2$) is known to enhance the radical reactivity of $Br_2$ and it is probably this synergistic effect which is instrumental in the rapid formation of a sheath around the filaments, during the first stage of the preoxidation step. With respect to the "bake-out" or second stage of this step, crosslinking and core conversion can be achieved in an inert atmosphere simply by thermal means. However, in the presence of an oxidizing agent, lower temperatures can be used and a more preferential graphic precursor structure obtained.

Although air is very satisfactory for use in this invention, the rate of preoxidation may be increased and/or the temperature lowered by using air enriched with oxygen, if desired.

The preoxidation process can be readily adapted to a continuous process for the treatment of fibers in which one or more high temperature reactors can be used in series and the fiber passed through the apparatus at a controlled rate of speed and tension. Because of the greater exposure of the yarn on being drawn through the heated reaction zones, the continuous process involves less total residence time than the batch process to reach the same degree of preoxidation. However, because of the poorer heat transfer of air as compared to the glass bobbin, higher temperatures may be required. Another advantage of the continuous process is that it affords better control of the tension on the yarn during the process, and thus better control of the orientation and structure of the preoxidized yarn.

Although no means short of actual carbonization or graphitization can be entirely relied upon as a gauge of the adequacy of the preoxidation treatment, there are several guides which can be generally depended upon to indicate inadequate or unsatisfactory preoxidative treatment. These are flammability and/or flash-off when placed in a Meker Burner flame, visible skin-core delineation in microscopic fiber cross-sections, interfilamentary fusion, poor knot strength and lack of sufficient strength for subsequent handling. Poor knot strength is usually indicative of interfilamentary fusion, while flammability or flash-off is indicative of undertreated filament cores. Although passing all of these preliminary tests does not necessarily assure that the preoxidized yarn can be successfully graphitized to give a high strength, high modulus yarn, these tests do provide a good indication that acceptable graphite fibers will result, and furthermore, those which fail one or more of these tests generally will not afford a high quality graphite yarn. Density may also be used as a direct gauge of adequacy of preoxidation.

Polyacrylonitrile yarns which have been preoxidized according to the procedure of this invention are in a preferred form for direct conversion, without further carbonization, to high strength, high modulus graphite yarns by means of any conventional procedure and apparatus used for this purpose. Graphitization of these preoxidized yarns may be attained by heating them to 1800–3000° C. in an inert atmosphere, e.g., in the presence of argon, and preferably while they are under tension. The graphitization may be performed using either static or continuous methods.

As stated above, the preoxidation process according to this invention is carried out while the fiber or yarn is held under tension. The application of longitudinal tension during preoxidation is known to greatly increase the strength and modulus of carbon and/or graphite fibers produced from such preoxidized fibers. The minimum amount of tension required depends on the various process conditions referred to above as well as on the specific acrylic fiber being treated. Generally, however, tension sufficient to limit shrinkage to not more than 20% of the original fiber length is the minimum amount that must be applied. On the other hand, the amount of tension does depend on the specific fiber and some acrylic fibers do not shrink as much as others under the conditions of preoxidation. Consequently, in these cases, at least enough tension must be applied to prevent their maximum shrinkage. The maximum amount of tension to be applied again depends on the specific fiber being processed, but it is obvious that it should not be so great as to break or damage the fiber. Tension sufficient to stretch the fiber during preoxidation is, of course, acceptable during this step. It is understood that the language "during preoxidation" includes the initial bromine-air treatment as well as the subsequent "bake-out" stage at higher temperatures.

The temperature employed during the bromine-air sheath-forming stage is below 250° C. and preferably below 230° C. It is indicated above that the time-temperature relationship will dictate the exact temperature employed. It has been found that a temperature of at least 180° C. is required for process economics. The temperature of the second stage of preoxidation is above 250° C., as indicated above, and the maximum temperature in this stage will be determined by the effect produced on the fiber. That is, the temperature should not be so great as to produce excessive cross-linking which results in a hard char and brittle fiber structure during subsequent graphitization.

Previously, it was pointed out that the amount of bromine employed is dependent on many factors. The actual amount used will, of course, depend on the desired effect. However, it must be sufficient to provide a sheath around the fiber so as to allow the fiber to be subjected to the higher oxidation temperatures during the second stage. Also, it bears repeating that the sheath must be permeable to oxygen during the second heating stage.

It is preferable, in most cases, to completely remove the bromine remaining in the atmosphere after the fiber has gone through the sheath-forming stage. In a batch process this is easily done by merely flushing the heating furnace and thereafter introducing air, without bromine, into the furnace which is at that point heated to the higher temperature. In a continuous process the bromine can be removed by providing a vacuum-air sweep baffle at the point of the continuous reactor where the desired permeable sheath formation is complete. This would effectively remove the bromine remaining in the atmosphere, and the air, or oxygen necessary for the second, higher temperature stage, is introduced into the reactor at a point just downstream from the baffle vacuum exit, and is withdrawn at the yarn exit port.

When graphitized at about 2900° C. the X-ray diffraction patterns of the graphite obtained from the bromine-air preoxidized yarn were totally different from those of the graphite obtained from air preoxidized yarn. The patterns from yarn preoxidized with air only, exhibited a pattern characteristic of a more or less conventionally oriented, so-called turbostratic structure, whereas those from the bromine-air preoxidized yarn, graphitized under the same conditions, exhibited a pattern characteristic of a highly oriented three dimensional crystalline structure.

Conditions necessary for the formation of three dimensional graphite were found to be temperatures in excess of 2600° C., relatively long residence times in the graphitization furnace, tension during graphitization and the presence of bromine in the preoxidized yarn. The three dimensional structure was not seen in any of the graphite yarns preoxidized with air only, regardless of the many combinations of conditions used.

Samples of graphite from the bromine-air preoxidized yarn were examined by electron microscopy and found to be highly crystalline and oriented. Although the exact mechanism responsible for the formation of the 3-D structure is not known, it is believed that the residual bromine in these yarns acts in some way to enhance the development of a highly oriented graphite structure.

Further, it has been found that the degree of crystallinity and orientation of graphite yarns obtained from bromine-air precursors can be varied and controlled within limits by a proper selection of graphitization conditions.

A comparison of X-ray patterns of bromine-air preoxidized yarns after subsequent graphitization at 2900° C. has shown that either the 3-D or the conventional structure could be obtained, the 3-D structure being obtained at longer residence times.

The surface of graphite yarn obtained by the bromine-air preoxidation process can be varied and controlled over a range of from very rough and pitted to very smooth. Relatively smooth surfaces may be obtained at lower temperatures of graphitization, or at shorter residence times.

The preoxidized yarn obtained by the bromine-air process is fireproof, flexible, strong, and dimensionally stable at high temperatures. The preoxidized yarn may be used for the construction of fabric from which fireproof articles such as clothing, tenting, coverings of various sorts and the like may be fashioned. Or the preoxidized yarn may be converted to graphite fibers which are extremely useful as the reinforcing medium in the fabrication of composite materials such as laminates, tapes, molded objects and other shaped articles.

While the invention described herein has been described in considerable detail with respect to certain specific embodiments and applications thereof, it is to be understood that such detailed descriptions have been for the purpose of illustration only and are not intended to limit the invention as it is defined in the claims. The following examples are given for the purpose of further illustrating the invention.

DESCRIPTION OF THE PREFERRED EMBODIMENTS

Example I

This example describes a batch preoxidation of continuous filament acrylonitrile-vinyl acetate (AN/VA-93/7) copolymer yarn with air only.

Approximately 70 feet of 1000 denier (500 filament, 2 d.p.f.) continuous filament AN/VA yarn (s.f. T/E/Mi=3.91/14.7/85) was pulled through an aqueous suspension of colloidal graphite and then wrapped under 200 g. tension onto a 45 mm. diameter Pyrex glass bobbin. No overlaps were allowed and the yarn ends were adhered to the bobbin. The bobbin was inserted and supported in the center of an 85 mm. diameter Pyrex glass reaction chamber which was 84 cm. long. An air flow of 2 standard cubic feet per hour (s.c.f.h.) was started through the chamber and the temperature in the reactor was programmed at 5° C./minute to 200° C. The air flow rate and temperature were maintained at 2 s.c.f.h. and 200° C. for 16 hours and then the temperature was increased (5° C./min.) to 260° C. and held at this temperature for 2 hours. The apparatus was cooled and the black, unbroken yarn cut from the bobbin. The yarn was strong, had good knot strength, was not fused, and showed no flash-off in a Meker Burner flame.

The preoxidized fiber was graphitized at 2700° C.–2900° C. under 100 g. tension and a graphite fiber obtained which had a modulus of $55 \times 10^6$ p.s.i., and a tensile strength of $250 \times 10^3$ p.s.i. The density of this fiber was 1.80 g./cc.

Example II

This example illustrates a batch brominative-air preoxidation of continuous filament AN/VA copolymer yarn. Approximately 70 feet of the same yarn as used in Example I was wrapped on a bobbin and inserted in the center of the glass reaction chamber in the same manner as described above. An air flow of 2 s.c.f.h. was started through the reaction chamber and the temperature programmed (5° C./min.) up to 225° C. and held at this temperature. As soon as a temperature of 225° C. was reached in the reaction chamber, inflowing air was diverted through an accessory chamber containing a bromine reservoir at room temperature. The supernatant bromine vapors were carried directly into the top of and through the heated reaction chamber. After 15 minutes exposure to the bromine-air atmosphere at 225° C., the air flow was again diverted to by-pass the bromine reservoir, and the temperature of the reaction chamber programmed (5° C./min.) to 310° C. and held at this temperature for 1 hour. After cooling, the black, unbroken yarn was cut from the bobbin and found to be free of fusion, to have excellent knot strength and to be free of any flash-off in a Meker Burner flame. The preoxidized yarn contained about 9–10% bromine.

The preoxidized yarn was graphitized at 2600° C. under 100 grams tension and a graphite fiber obtained which had a modulus of $55 \times 10^6$ p.s.i. and a tensile strength of $200 \times 10^3$ p.s.i. The density of this fiber was 1.85 g./cc.

Example III

The procedure described in Example II was repeated except that nitrogen was used in place of air as the sweep gas in both the bromination and bake-out stages of the preoxidation step. The yarn which had a 0.68 twist was treated at 225° C. for 30 minutes at 1 s.c.f.h. $N_2$ flow in the bromination stage and for 2 hours at 280° C. at 2 s.c.f.h. flow rate during the bake-out stage. Excessive internal stresses developed during the bake-out stage of the preoxidation resulting in numerous broken filaments and broken yarn. The preoxidized yarn flashed in the Meker Burner flame, was fused and had very little knot strength. The yarn was too brittle to handle for further treatment.

Example IV (A) The experiment described in Example III was repeated using the same yarn with the exception that air was used in place of nitrogen for both the bromination and bake-out stages of the preoxidation reaction. The black yarn obtained did not burn or flash off in the Meker Burner, did not fuse and had good knot strength. The preoxidized yarn contained 9.8% residual bromine. On graphitization under 100 g. tension with a 140 sec. residence time, a graphite yarn was obtained having a modulus of $52.7 \times 10^6$ p.s.i. and a tensile strength of $132 \times 10^3$ p.s.i. The X-ray diffraction pattern indicated a turbostratic structure.

(B) A repeat of the above experiment in exact detail as described produced a preoxidized yarn that was flameproof, had no flash-off in the Meker Burner, did not fuse and had good knot strength.

Graphitization under the same conditions as above, except at 2900° C. for 90 sec. gave a graphite yarn having a modulus of $52 \times 10^6$ p.s.i. and a tensile strength of $152 \times 10^3$ p.s.i. The X-ray diffraction pattern indicated a three dimensional non-turbostratic graphite structure.

Example V

Several samples of the PAN yarn of Example I were preoxidized using a continuous reactor described above. Temperature (of bromination and air treatment), flow rates, and yarn speeds were varied as well as tension, in order to determine the optimum conditions for preoxidation. The best conditions were found to be a first stage (bromination) chamber temperature of 225° C. with an air flow rate of 0.1 s.c.m.h.; and a second stage air chamber temperature of 315° C. with a flow rate of 3–5 s.c.f.h. The preoxidized yarn had the following properties. Density, 1.634; Tensile Strength, $76.0 \times 10^3$ p.s.i.; Corrected Modulus, $2.90 \times 10^6$ p.s.i.; Cross Section, $8.59 \times 10^{-4}$ cm.$^2$.

Example VI

Samples of yarn preoxidized as described in Example V were graphitized under varying combinations of conditions with a 60 seconds residence time in the graphitization furnace, and the physical properties of the graphite fibers thus obtained were measured. The results are given in the following table.

| Filament/ bundle* | Temperature, °C. | Load, gms. | Cross section ($\times 10^{-4}$ cm.$^2$) | Denier, gms./cc. | Tensile strength** ($\times 10^3$ p.s.i.) | Corrected** modulus ($\times 10^6$ p.s.i.) |
|---|---|---|---|---|---|---|
| 500 | 2,600 | 75 | 3.37 | 1.813 | 211 | 57.8 |
| 500 | 2,900 | 75 | 3.13 | 1.920 | 180 | 66.0 |
| 500 | 2,600 | 100 | 3.32 | 1.659 | 166 | 38.4 |
| 500 | 2,650 | 100 | 3.14 | 1.748 | 242 | 51.0 |
| 500 | 2,900 | 100 | 3.07 | 1.935 | 178 | 61.0 |
| 500 | 2,900 | 125 | 2.90 | 1.962 | 96.0 | 70.0 |
| 2,200 | 2,700 | 600 | 9.26 | 1.811 | 178.0 | 61.0 |
| 2,200 | 2,700 | 600 | 10.5 | 1.845 | 240.0 | 60.0 |
| 2,200 | 2,600 | 300 | 10.2 | 1.785 | 192.0 | 61.8 |
| 2,200 | 2,600 | 300 | 10.5 | 1.821 | 188.0 | 60.4 |

*S.f. 2 d.p.f.
**Single filament properties determined on an Instron apparatus at standard conditions, 1″ gauge length, operating at an extension rate of 0.02″/min.

What is claimed is:

1. A process for oxidizing acrylic fibers which comprises heating said fibers in a first stage, while under tension, to a temperature below 250° C. in an atmosphere containing oxygen and bromine for a time sufficient to form an oxygen permeable sheath around said fibers, and thereafter heating said fibers in a second stage, at a temperature above 250° C., while under tension in an atmosphere containing oxygen for a time sufficient to allow substantially complete permeation of oxygen throughout the core of the fiber.

2. A process according to claim 1 wherein the temperature of the first stage is below 230°C.

3. A process according to claim 1 wherein the temperature of the first stage is between 180 C. and 250° C.

4. A process according to claim 1 wherein the temperature of the second stage is above 270° C.

5. A process according to claim 2 wherein the residence time in the first stage is less than one hour.

6. A process according to claim 1 wherein the tension in both stages is sufficient to allow not more than about 20% shrinkage of said fiber.

7. A process according to claim 1 wherein the oxidized fiber is subsequently graphitized by heating to a temperature above 2500° C. in an inert atmosphere.

8. A process according to claim 1 wherein the bromine is removed from the atmosphere after completion of the first stage.

9. A process according to claim 8 wherein the atmosphere of the first stage contains sufficient bromine to provide that the fiber emerging from the second stage contains at least about 1.0% by weight of bromine.

10. A process for producing graphite fibers which comprises heating an acrylic fiber in a first stage, while under tension sufficient to allow not more than about 20% shrinkage, to a temperature of between 180° C. and 250° C. in an atmosphere containing oxygen and bromine for a time sufficient to form an oxygen permeable sheath around said fibers, thereafter heating said fibers in a second stage, while under tension, to a temperature of between 250° C. and 350° C. in an oxygen containing atmosphere for a time sufficient to allow substantially complete permeation of oxygen throughout the core of said fiber, and subsequently graphitizing said fiber by heating to a temperature above 2500° C. in an inert atmosphere.

References Cited
UNITED STATES PATENTS

| | | | |
|---|---|---|---|
| 2,799,915 | 7/1957 | Barnett et al. | 8—115.5X |
| 3,285,696 | 11/1966 | Tsunoda et al. | 23—209.1 |
| 3,412,062 | 11/1968 | Johnson et al. | 23—209.1X |
| 3,497,318 | 2/1970 | Noss | 23—209.1 |

EDWARD J. MEROS, Primary Examiner

U.S. Cl. X.R.

8—115.5